(12) United States Patent
Taminger et al.

(10) Patent No.: US 8,344,281 B2
(45) Date of Patent: Jan. 1, 2013

(54) USE OF BEAM DEFLECTION TO CONTROL AN ELECTRON BEAM WIRE DEPOSITION PROCESS

(75) Inventors: Karen M. Taminger, Yorktown, VA (US); William H. Hofmeister, Nashville, TN (US); Robert A. Hafley, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 391 days.

(21) Appl. No.: 12/751,075

(22) Filed: Mar. 31, 2010

(65) Prior Publication Data

US 2010/0270274 A1 Oct. 28, 2010

Related U.S. Application Data

(60) Provisional application No. 61/173,292, filed on Apr. 28, 2009.

(51) Int. Cl.
*B23K 15/00* (2006.01)
(52) U.S. Cl. ......... 219/121.13; 219/121.14; 219/121.16; 219/121.17
(58) Field of Classification Search .............. 219/121.13, 219/121.14, 121.16, 121.17, 121.29; 700/118, 700/108, 119; 264/482; 382/141–151; 218/137 R, 218/136
See application file for complete search history.

(56) References Cited

U.S. PATENT DOCUMENTS

| 4,295,808 | A | * | 10/1981 | Stephan et al. ............ 425/8 |
| 4,900,695 | A | | 2/1990 | Takahashi et al. |
| 5,994,659 | A | | 11/1999 | Offer |
| 6,046,426 | A | | 4/2000 | Jeantette et al. |
| 6,143,378 | A | | 11/2000 | Harwell et al. |
| 6,405,095 | B1 | | 6/2002 | Jang et al. |

(Continued)

FOREIGN PATENT DOCUMENTS

GB 2418166 A 3/2006

(Continued)

OTHER PUBLICATIONS

William H. Hofmeister, Robert A. Hafley, Karen M. Taminger, Kim S. Bey, Thermal imaging and control of electron beam freeform fabrication (ebf3) Presented at MS & T '05 on Sep. 27, 2005.

*Primary Examiner* — Samuel M Heinrich
(74) *Attorney, Agent, or Firm* — Robin W. Edwards; Andrea Z. Warmbier; Jennifer L. Riley

(57) ABSTRACT

A method for controlling an electron beam process wherein a wire is melted and deposited on a substrate as a molten pool comprises generating the electron beam with a complex raster pattern, and directing the beam onto an outer surface of the wire to thereby control a location of the wire with respect to the molten pool. Directing the beam selectively heats the outer surface of the wire and maintains the position of the wire with respect to the molten pool. An apparatus for controlling an electron beam process includes a beam gun adapted for generating the electron beam, and a controller adapted for providing the electron beam with a complex raster pattern and for directing the electron beam onto an outer surface of the wire to control a location of the wire with respect to the molten pool.

16 Claims, 2 Drawing Sheets

U.S. PATENT DOCUMENTS

| | | |
|---|---|---|
| 6,476,343 B2 | 11/2002 | Keicher et al. |
| 6,509,568 B1 | 1/2003 | Ooae et al. |
| 6,593,008 B2 | 7/2003 | Schmidt |
| 6,667,486 B2 | 12/2003 | Ohta et al. |
| 6,710,296 B2 | 3/2004 | Siedal |
| 6,727,459 B1 | 4/2004 | Bialach |
| 6,813,533 B1 | 11/2004 | Semak |
| 6,943,507 B2 | 9/2005 | Winkler et al. |
| 6,995,334 B1 | 2/2006 | Kovaccvic et al. |
| 7,073,561 B1 * | 7/2006 | Henn .................. 164/94 |
| 7,168,935 B1 * | 1/2007 | Taminger et al. ........ 425/174.4 |

FOREIGN PATENT DOCUMENTS

| | | |
|---|---|---|
| JP | 56036393 A * | 4/1981 |
| JP | 2002178177 A * | 6/2002 |

* cited by examiner

USE OF BEAM DEFLECTION TO CONTROL AN ELECTRON BEAM WIRE DEPOSITION PROCESS

CROSS-REFERENCE TO RELATED APPLICATIONS

This application claims priority to and the benefit of U.S. Provisional Application 61/173,292, filed on Apr. 28, 2009, which is hereby incorporated by reference in its entirety. In addition, this application is co-pending with the related application entitled "CLOSED-LOOP PROCESS CONTROL FOR ELECTRON BEAM FREEFORM FABRICATION AND DEPOSITION PROCESSES," U.S. application Ser. No. 12/750,991, filed on the same day and owned by the same assignee as this application, the contents of which are incorporated herein by reference in their entirety.

ORIGIN OF THE INVENTION

This invention was made in part by employees of the United States Government and may be manufactured and used by or for the Government of the United States of America for governmental purposes without the payment of any royalties thereon or therefor.

TECHNICAL FIELD

The present invention relates to a method and apparatus for controlling a beam position during an electron beam wire deposition process.

BACKGROUND OF THE INVENTION

Electron beam freeform fabrication or $EBF^3$ is an emerging manufacturing deposition process in which an electron beam is used in conjunction with a wire feed in order to progressively build material on a substrate in a layered manner. The electron beam is translated with respect to a surface of the substrate while the wire is melted and fed into a molten pool. In an $EBF^3$ process, a design drawing of a three-dimensional (3D) object may be sliced into different layers as a preparatory step, with the electron beam tracing each of the various layers within a relatively high-vacuum environment. The layers cool into a desired complex or 3D shape.

Conventional electron beam control methodologies may be less than optimal for certain purposes, such as for maintaining an even or consistent material deposition height. In addition, manual controls are often used to retain the wire feedstock as it is fed into and captured in the beam and the molten pool. Perturbations may cause the wire to stray from the beam path and/or the molten pool, potentially causing transient instability and discontinuities in the deposited material. Moreover, convention deposition control processes perform a single process at a time, modulating the electron beam between processing steps for serial application of different techniques. With the development of $EBF^3$, control processing complexity has increased dramatically.

SUMMARY OF THE INVENTION

Accordingly, a control method and apparatus are set forth herein for an electron beam process, e.g., electron beam welding and electron beam freeform fabrication ($EBF^3$). The method, which is executable via the control apparatus set forth herein, provides for complex rastering of an electron beam generated in a vacuum, such as the chamber of an electron beam gun, and enables several processing functions or tasks to be performed simultaneously in parallel rather than in series. Thermal input into the $EBF^3$ process results in self-correcting control and steering of a wire with respect to a molten pool formed during the process.

The present invention contemplates a splitting of the duty cycle of the electron beam during rastering. This in turn enables real-time control of electron beam processing, along with the simultaneous achievement of multiple tasks or objectives. Process control is thus optimized at lower relative power consumption levels while minimizing undesirable process issues, e.g., selective vaporization of low vapor pressure alloying elements, thermal residual stress, and distortion, associated with excessive thermal input into components during electron beam processing. Beam rastering as set forth herein may dramatically reduce the number of flaws encountered, particularly during $EBF^3$. The method uses beam deflection to preheat and steer the wire into the molten pool, thus reducing a primary flaw source when the wire exits the pool.

The self-corrective method provides for control over the location, power, and dwell time of the electron beam to generate a complex raster pattern, and uses the raster pattern to control thermal input and distribution. The raster pattern redirects the wire, and retains a position of the wire with respect to the molten pool by focusing the beam on the outside of the wire. This selectively heats the outer edges of the wire, and prevents straying of the wire from the molten pool. The method is "self-correcting" in that it maintains the wire in the pool without requiring sensing or external changes to the raster pattern or wire orientation.

In particular, a method is provided for controlling an electron beam process, e.g., welding and $EBF^3$, wherein a wire is melted by the heat of an electron beam and deposited as a molten pool on a substrate, where the molten pool cools to form a layer. The method includes generating the electron beam with a complex raster pattern or patterns, and directing the electron beam with its complex raster pattern onto outer surfaces of the wire to thereby steer the wire with respect to the molten pool. Directing the electron beam locally preheats the wire, thereby retaining a position of the wire, again with respect to the molten pool.

An apparatus for controlling an electron beam process is also provided, with the apparatus including an electron beam gun, adapted for generating the electron beam, and a controller. The controller is in communication with the electron beam gun to provide the electron beam with the complex raster pattern, and to direct the beam onto an outer surface of the wire. In this manner, a location or position of the wire is controlled and maintained with respect to the molten pool.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
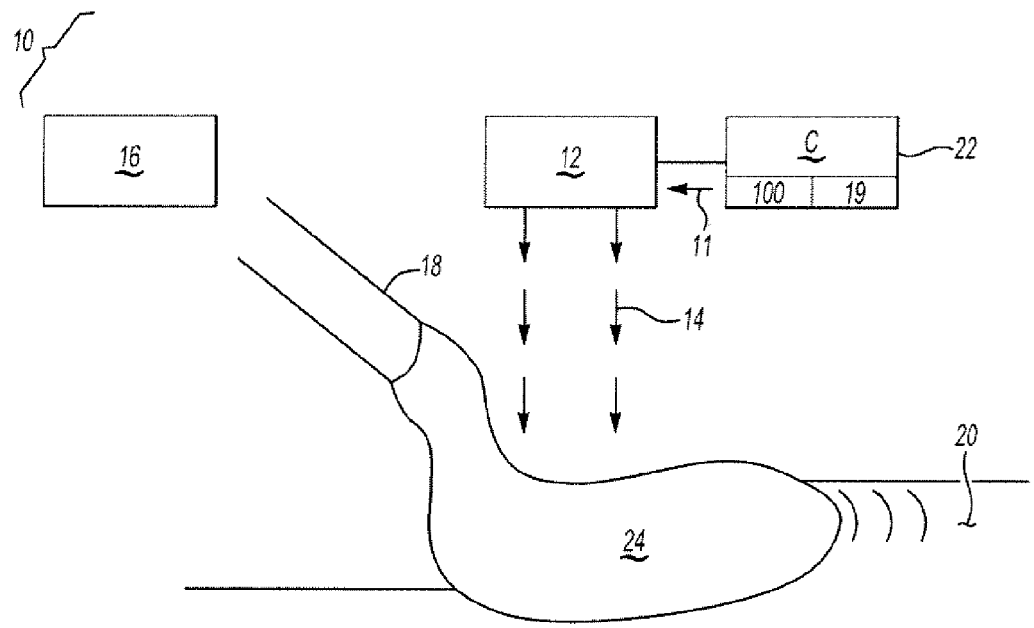
FIG. 1 is a schematic illustration of elements of an electron beam freeform fabrication ($EBF^3$) apparatus in accordance with the invention.

Referring to the drawings wherein like reference numbers represent like components throughout the several figures, and beginning with FIG. 1, an apparatus 10 is configured for forming a product using an electron beam 14. Such a process may include beam welding, or, in another embodiment, may include electron beam freeform fabrication, hereinafter abbreviated as $EBF^3$ for simplicity. The apparatus 10 includes an electron beam gun 12 adapted to generate the electron beam 14. While the electron beam 14 is shown external to the electron beam 12 for clarity, those of ordinary skill in the art will recognize a vacuum chamber (not shown) is present within which the electron beam 14 is ultimately generated and contained.

The apparatus 10 includes a wire feeder 16 adapted for feeding a length of consumable wire 18 toward a substrate 20, and a controller (C) 22. The substrate 20 may be positioned on a moveable platform (not shown), with the platform and/or the gun 12 being movable via a multi-axis positioning system (not shown). Alternately, the electron beam gun 12 may be completely enclosed within the vacuum chamber so that the electron beam gun is also moved rather than just the substrate 20. In either embodiment, relative motion occurs between the electron beam gun 12 is and the substrate 20.

The wire 18 is typically a suitable metal such as aluminum or titanium, although the actual material may vary depending on the desired application. Controller 22 includes an algorithm 100 adapted for controlling the $EBF^3$ process conducted by the apparatus 10. Controller 22 is electrically connected to the electron beam gun 12, and adapted to transmit control signals 11 thereto for control of certain operations of the gun and the electron beam 14, which ultimately melts the wire 18 into a molten pool 24 and deposits it on a substrate 20, where it ultimately cools to form a layer of a product.

The wire 18, when sufficiently heated by the electron beam 14, e.g., to over approximately 3000° F. in one embodiment, is accurately deposited, layer upon layer, using a set of design data 19, e.g., Computer Aided Design (CAD) data or another 3D design file. In this manner, a 3D structural part may be created in an additive manner without the need for a casting die or mold. Rapid prototyping and hands-free manufacturing of vehicle, airplane, spacecraft, and/or other complex components or parts is thus enabled.

Figure 2:
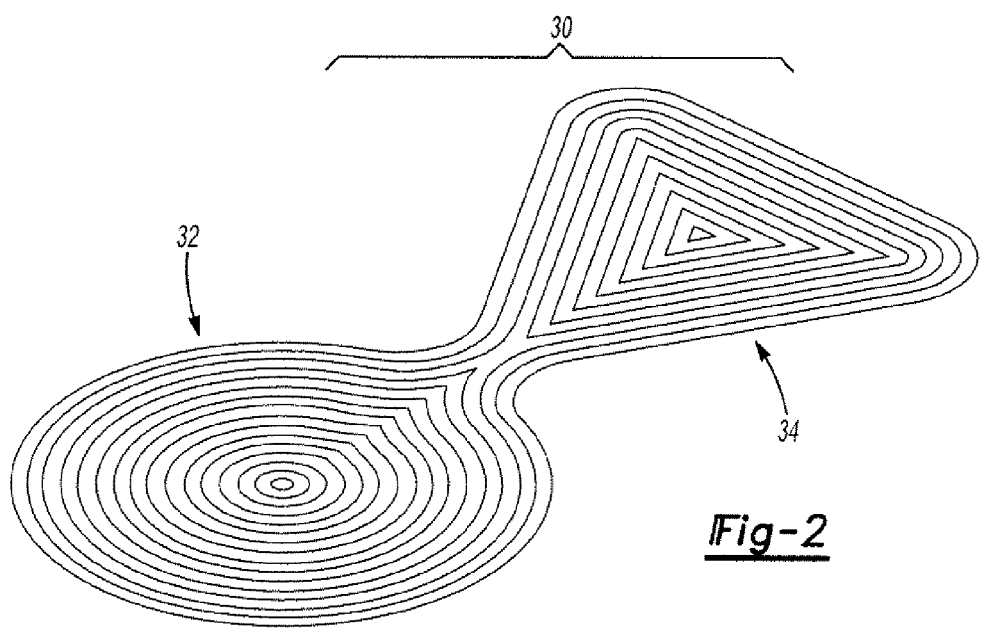
FIG. 2 is a schematic illustration of one possible embodiment of a raster pattern usable with the apparatus of FIG. 1.
Figure 4:
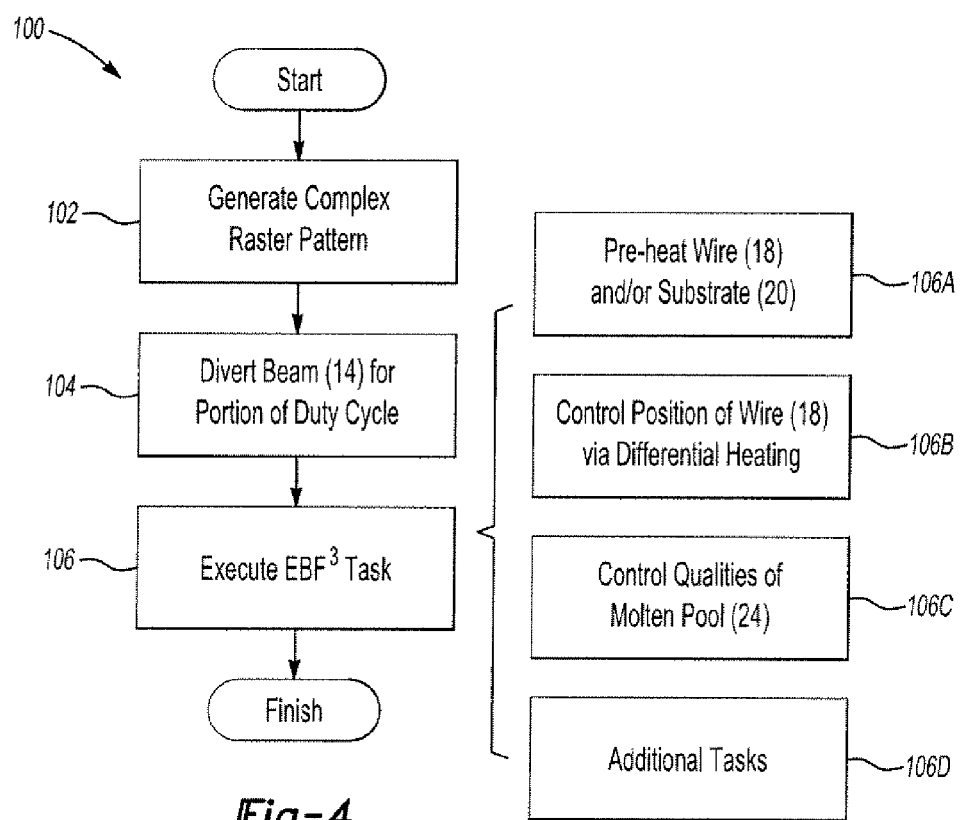
FIG. 4 is a flow chart describing the method of the invention.

Still referring to FIG. 1, the controller 22, using the algorithm 100 described below with reference to FIG. 4, is adapted to control the electron beam gun 12 via automatic modulation of the electron beam 14 or otherwise in order to generate a sufficiently complex raster pattern. As used herein, the term "complex raster pattern" refers to a pre-programmed pattern having multiple shapes together, e.g., as shown in FIG. 2, or an adaptive control loop wherein the shape of the raster pattern is changed. In the latter pattern, the raster pattern may be linked to the geometry of a CAD or other design drawing being built, or the raster pattern is otherwise actively modified by controller 22.

One possible embodiment of a usable raster pattern is shown as pattern 30 in FIG. 2 and described below. However, the exact raster pattern may vary widely without departing from the intended inventive scope. Whatever shape the raster pattern ultimately takes, the pattern partitions beam energy of the electron beam 14 before entering the molten pool 24, thus preheating the substrate 20 in advance of the molten pool and preheating the wire 18 used as feedstock during the deposition process.

During $EBF^3$ processing, the beam rastering capability of controller 22 is orders of magnitude faster than the thermodynamic rate of the wire melting process. so part of its duty cycle may be used to redirect the electron beam 14, e.g., for fractions of a second, without impairing the deposition process. This diversion may allow the electron beam 14 to be focused at different locations to simultaneously achieve a variety of effects. The electron beam 14 of FIG. 1 can also be split into multiple beams for parallel processing. For example, in addition to performing deposition as shown in FIG. 1, the beam 14 may also be diverted to: (1) preheat the substrate 20 or to deposit material in front of the molten pool 24, which may enhance fusion between the deposited material and the substrate, and which may help to control deposit geometry as shapes change; (2) preheat the wire 18 before it enters the molten pool 24, thus reducing the total amount of energy required to melt the wire 18, thereby reducing total power input into the $EBF^3$ process, thereby reducing overheating, induced residual stresses, and loss of low vapor pressure alloying elements; (3) control the position of the wire 18 through differential heating; (4) control or change the shape and temperature distribution of the molten pool 24; (5) heat treat the immediate and distant vicinity of the molten pool 24 to eliminate thermal residual stresses and distortion; and (6) in-situ process observation of the electron beam 14, and detection of diffracted or secondary electrons using an electron beam detector, such as those used on scanning electron microscopes.

Referring to FIG. 2, the present invention provides unique beam raster patterns and successfully demonstrates techniques (1-6) noted above. An example of one such raster pattern is shown as pattern 30. Pattern 30 may include different patterns of varying size and/or complexity, e.g., a round pattern portion 32 and a triangular pattern pattern 34. The round pattern portion 32 of pattern 30 is intended to keep a substantially circular-shaped molten pool 24, i.e., item (4) in the list cited above. The triangular pattern portion 34 may be focused on preheating the wire 18 immediately in front of the molten pool 24, and on preheating the wire during the deposition process. See items (1) and (2), respectively, in the list cited above. Pattern 30 of FIG. 2 uses dwell time to control the partitioning of the incident energy of beam 14 in the molten pool 24, on the wire 18, and in advance of the molten pool 24 to minimize the thermal input into the $EBF^3$ process, while still maintaining high quality deposits on the substrate 20.

Referring to FIG. 2, advanced beam rastering can be used to direct the energy into the wire (item 2 above), and maintain process continuity through self correction (item 3 above). This may be achieved by controlling the location, power, and dwell time of the beam 14 to precisely control the thermal input and distribution in the apparatus 10 of FIG. 1. This is a direct result of the particular raster pattern used to deflect the electron beam 14.

Figure 3:
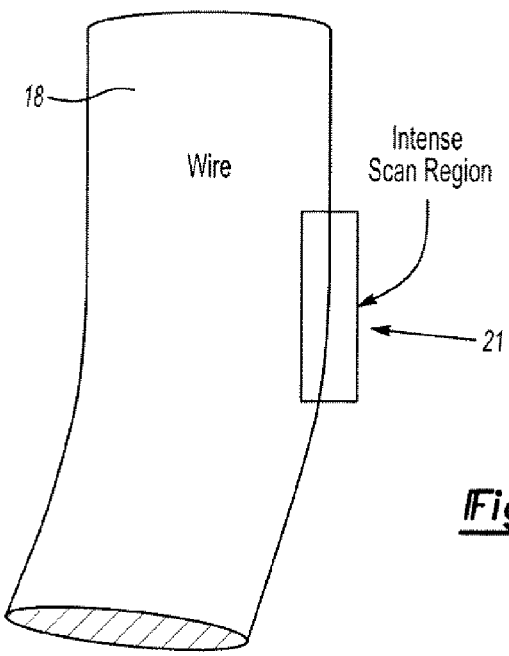
FIG. 3 is a schematic illustration of an electron beam raster pattern, such as of the type shown in FIG. 2, being used as a wire guide during an $EBF^3$ process.

Referring to FIG. 3, some beam rastering patterns may be able to redirect the wire 18 to keep it in the molten pool 24 (see FIG. 1). This may be achieved through a focusing of the electron beam 14 on the outsides of the wire, as indicated by the intense scan region 21. Selective heating of the outer edges of wire 18 is provided when the wire would otherwise stray from the molten pool 24 of FIG. 1. For example, in FIG.

3, if the wire 18 is straying too far to the right, modifying the beam raster pattern to increase the scanning intensity and dwell time over the intense scan region 21 will have the effect of selectively heating the outer edge of wire 18 to push the wire back to the left into the molten pool 24. This approach requires monitoring of the wire 18 position relative to the molten pool 24 and a modification to the raster pattern to correct the wire 18 position as necessary to maintain a consistent process.

As a result of a change in stiffness due to localized heating, the wire 18 automatically curls away from heat applied to its outer edge and back into the molten pool 24. The net result is that with a fixed beam raster pattern where an intense scan region 21 is continuously maintained on both right and left sides of the wire 18, i.e., one that is not being externally changed to react to the wire position, the process becomes self-correcting. This maintains the position of the wire 18 with respect to the molten pool 24 of FIG. 1 without requiring sensing or external changes to the raster pattern, e.g., pattern 30 of FIG. 2, or wire orientation to maintain process consistency.

Referring to FIG. 4, and with reference to the structure of the apparatus 10 shown in FIG. 1, algorithm 100 begins at step 102, wherein the controller 22 controls the electron beam gun 12 to generate the complex raster pattern, e.g., pattern 30 shown in FIG. 2. For example, the controller 22 may automatically modulate the electron beam 14 or use other suitable means in order to generate a desired complex raster pattern as described above. The algorithm 100 then proceeds to step 104.

At step 104, the controller 22 diverts the electron beam 14 for a portion of the duty cycle. As noted above, the beam rastering capability of controller 22 is orders of magnitude faster than the thermodynamic rate of the wire melting process, so beam 14 may be redirected for fractions of a second without impairing the deposition process. The algorithm 100 then finishes with step 106, wherein the required EBF$^3$ tasks are executed using the diverted portions of the beam 14.

Step 106 may entail various different sub-steps 106A-106D. For example, step 106A allows for the pre-heating of wire 18 and/or the substrate 20 in advance of the molten pool 24 using diverted beam energy. Step 106B may include positioning or guiding of the wire 18 as shown in FIG. 3 and as explained above. Step 106C can include controlling desired qualities of the molten pool 24, e.g., shape and/or position. Step 106D can include any other additional EBF$^3$ tasks at hand, such as but not limited to heat treating the immediate and distant vicinity of the molten pool 24 to eliminate thermal residual stresses and distortion as noted above, in-situ process observation of beam 14, etc.

The innovations in this disclosure are at least twofold. First is the concept of splitting the duty cycle of the electron beam via beam rastering. Second, due to the first concept, a beam rastering technique is provided that dramatically reduces the number of flaws encountered during EBF$^3$. This concept uses beam deflection to preheat and steer the wire 18 into the molten pool 24, reducing one of the primary sources of flaws from the wire pushing out of the molten pool. The innovation in this disclosure can be directly applied to EBF$^3$ systems, such as the apparatus of U.S. Pat. No. 7,168,935, to improve the control of the wire and the molten pool during EBF$^3$ processing.

While the best modes for carrying out the invention have been described in detail, those familiar with the art to which this invention relates will recognize various alternative designs and embodiments for practicing the invention within the scope of the appended claims.

What is claimed as new and desired to be secured by Letters Patent of the United States is:

1. A method for controlling an electron beam process wherein a wire is melted and deposited onto a substrate as a molten pool, the method comprising:
   determining the position of the wire relative to the molten pool;
   identifying a scan region on the wire using the position;
   generating an electron beam having a complex raster pattern; and
   selectively heating an outer surface of the wire by focusing a portion of the complex raster pattern on the scan region, thereby guiding the wire as it is fed toward the substrate;
   wherein selectively heating the outer surface of the wire retains a position of the wire with respect to the molten pool.

2. The method of claim 1, wherein generating the complex raster pattern includes controlling each of a location, a power, and a dwell time of the electron beam with respect to the scan region.

3. The method of claim 1, wherein the electron beam process is one of: electron beam welding and electron beam freeform fabrication.

4. The method of claim 1, further comprising splitting a duty cycle of the electron beam, and temporarily diverting the electron beam to simultaneously execute several processing functions.

5. The method of claim 1, further comprising:
   selectively preheating a portion of the substrate using the electron beam, the portion of the substrate being positioned ahead of the molten pool with respect to the wire.

6. A method for controlling an electron beam freeform fabrication process wherein a wire is melted and deposited onto a substrate as a molten pool, the method comprising:
   generating an electron beam having a complex raster pattern;
   determining when the wire begins to move away from the molten pool; and
   directing a portion of the complex raster pattern of the electron beam onto a scan region on a side of an outer surface of the wire to thereby selectively and locally heat the outer surface at the scan region, and to thereby maintain the position of the wire with respect to the molten pool; and
   wherein the electron beam steers the wire into the molten pool by causing the wire to curl away from the scan region, thereby retaining the position of the wire with respect to the molten pool.

7. The method of claim 6, further comprising: forming a three-dimensional component in progressive layers using the molten pool.

8. The method of claim 6, wherein generating the electron beam having a complex raster pattern comprises: controlling each of a location, a power, and a dwell time of the electron beam with respect to the scan region.

9. The method of claim 6. further comprising: splitting a duty cycle of the electron beam, diverting the electron beam using the split duty cycle, and simultaneously executing several processing functions using the diverted electron beam.

10. The method of claim 9, wherein the several processing functions comprise at least one of: preheating of the substrate, preheating the wire before it enters the molten pool, controlling the shape and temperature distribution of the molten pool, and heat treating a vicinity of the molten pool.

11. An apparatus for controlling an electron beam process wherein a wire is melted and deposited onto a substrate as a molten pool, the apparatus comprising:

a beam gun adapted for generating the electron beam; and
a controller adapted for:
providing the electron beam with a complex raster pattern;
determining the position of the wire relative to the molten pool;
identifying a scan region on a side of the wire using the position; and
directing a portion of the complex raster pattern of the electron beam onto the identified scan region on the outer surface of the wire to selectively heat the scan region, thereby maintaining the position of the wire with respect to the molten pool.

12. The apparatus of claim 11, wherein the controller is adapted for generating the complex raster pattern by controlling each of a location, a power, and a dwell time of the electron beam with respect to the scan region.

13. The apparatus of claim 11, wherein the controller is adapted for splitting a duty cycle of the electron beam, and for using portions of the duty cycle to divert the electron beam for simultaneously executing additional processing functions.

14. The apparatus of claim 11, wherein the controller is adapted for receiving a three-dimensional design file, dividing the design file into a plurality of layers, and for forming a product using the plurality of layers.

15. The apparatus of claim 14, wherein the product is a three-dimensional component or part of at least one of: a vehicle, an aircraft, and a spacecraft.

16. The apparatus of claim 11, wherein the controller is adapted to change the stiffness of the wire using localized heating of the wire at the scan region, thereby causing a curling of the wire toward the molten pool.

* * * * *